March 24, 1964  F. P. WILLIAMS  3,126,333
SEWAGE TANK AND METHOD OF SEWAGE TREATMENT
Filed Aug. 28, 1959  2 Sheets-Sheet 1
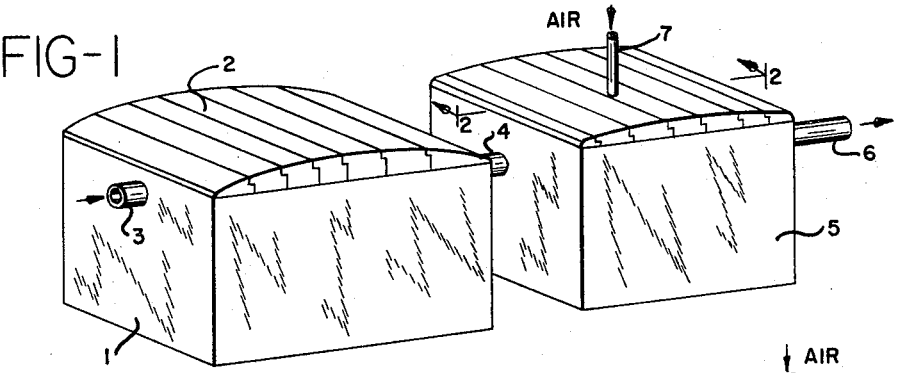
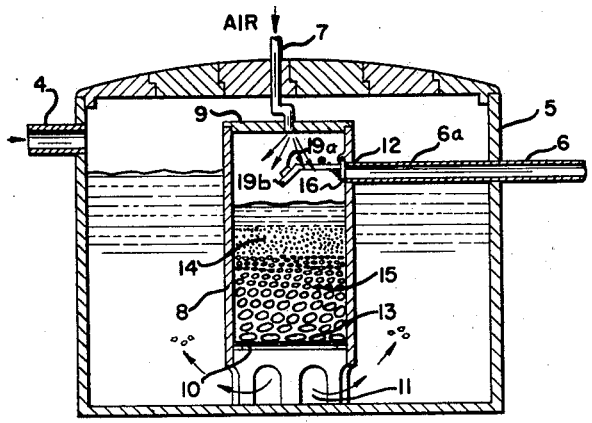
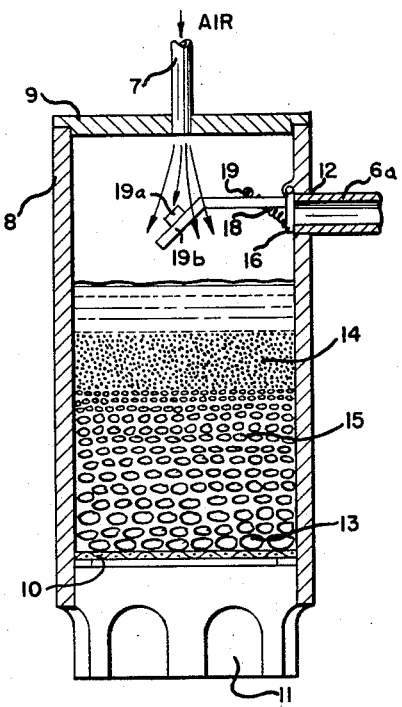
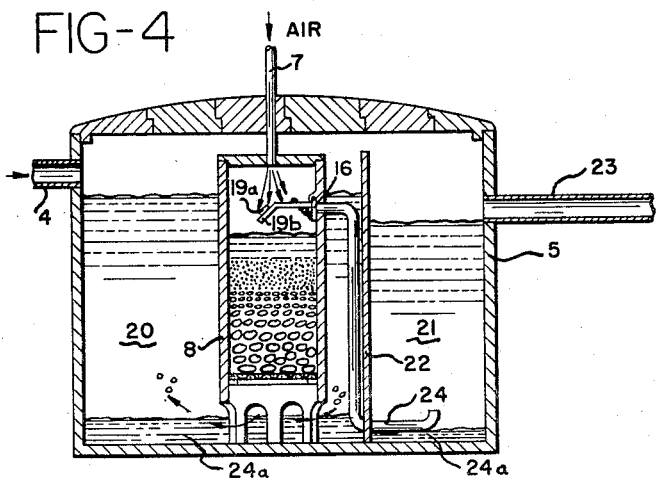
INVENTOR.
FREDERICK P. WILLIAMS
BY
ATTORNEYS

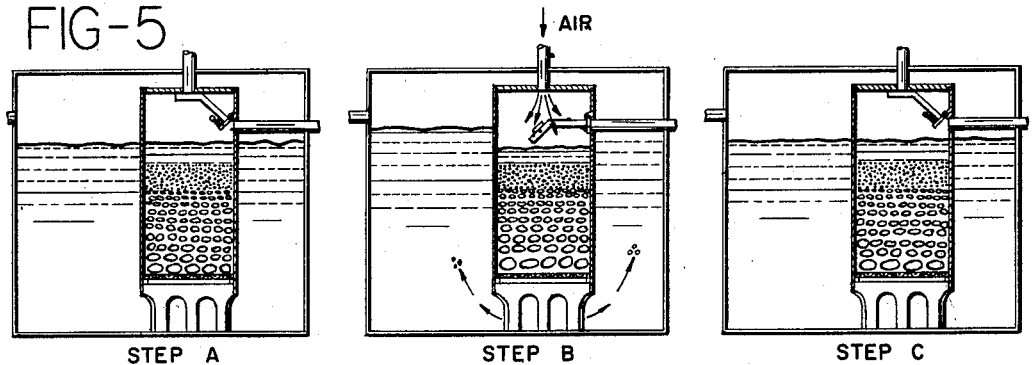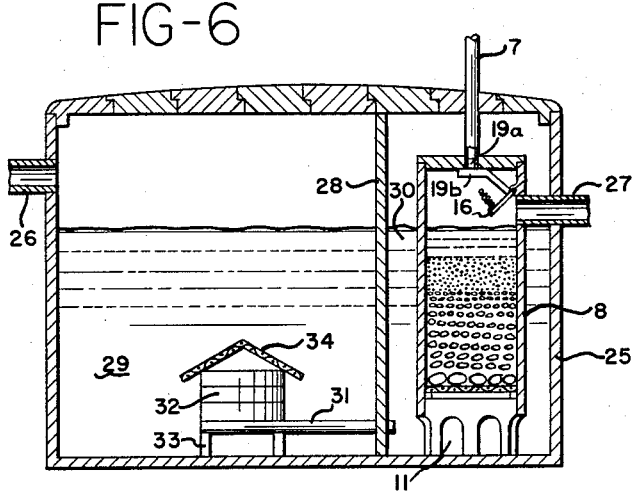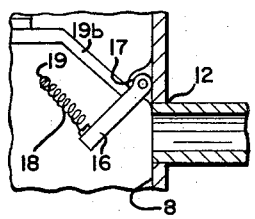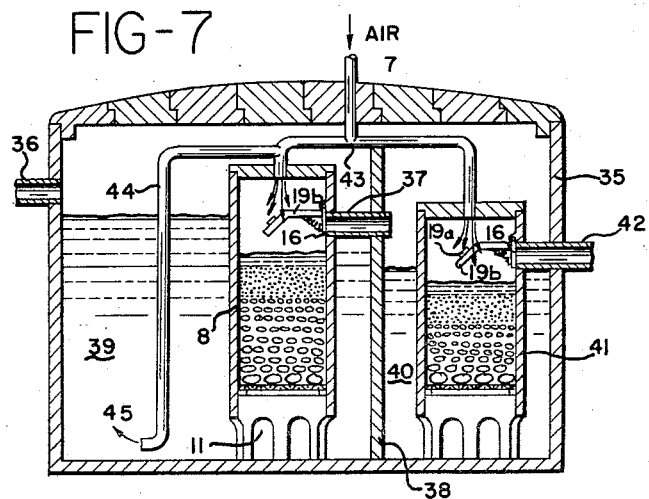

United States Patent Office 3,126,333
Patented Mar. 24, 1964

3,126,333
SEWAGE TANK AND METHOD OF SEWAGE TREATMENT
Frederick P. Williams, 612 Wedgewood Ave., Dayton, Ohio
Filed Aug. 28, 1959, Ser. No. 836,796
3 Claims. (Cl. 210—15)

The present invention relates to sewage treatment tanks, and more particularly to sewage after it has passed through a typical sewage treatment, as well as a single treatment system.

It has been found that the digestive action in an ordinary septic tank is not altogether satisfactory because the effluent is not completely devoid of bacteria and odor. In this case, the leaching bed would be required to take care of the excess solids in the evacuated liquid. This, in turn, may cause early pollution of the leaching bed.

Various ways have been proposed heretofore to treat the effluent with rays and chemicals for killing off the bacteria as they pass through the outlet pipe. But these arrangements are somewhat expensive to install and to maintain and do not reduce the suspended or dissolved solids in the effluent. Also the cathode and/or X-ray tubes require constant service and experience which may not be available to the ordinary sewage treatment tank user. Furthermore, chemicals require periodical replacement.

The primary object of my invention is to provide a septic system which may include one or more tanks and in which a highly digestive action takes place within the last stage tank, i.e. at a position just prior to the evacuation of the effluent.

Another object is to improve the separation of the solid and liquid portions of the excrement and, more particularly, to extract the solid particles from the semi-liquid portion so that the effluent is more free from odor and contamination.

A further object is to provide an attachment to a sewage treatment tank or constituting a treatment tank in itself, for more efficiently causing the digestion of sewage in order to relieve the burden on the leaching bed and on occasion to permit discharge to a stream, sewer line etc.

A still further object is to provide an improved form of filter in separating the solid or semi-solid particles from the liquid and, in particular, to provide for automatically activating the filter from time to time.

Another object is to provide a self-cleansing filter of the sand-gravel type for use in a septic tank or as forming an integral part of the tank.

The final object is to provide a septic tank containing a filter and in which media is employed for accelerating the bacteria effect in and around the filter and using the same media for cleaning the filter at desired times.

The above objects are carried out in brief by providing a chamber containing a self-cleaning filter of the sand-gravel type for use in a septic tank, together with gaseous means within and around the chamber for encouraging bacteria action and in which the gaseous means, in addition, serves to drive the sewage temporarily out of said chamber and then to permit the sewage to return in order to give a "back-wash" effect in the filter.

The invention will be better understood when reference is made to the following description and accompanying drawings, in which:

FIGURE 1 shows a typical septic tank emptying into a second tank which has been improved in accordance with the principles of my invention;

FIGURE 2 is a cross-sectional view taken along 2—2 in FIGURE 1, showing the improved filter, together with an arrangement for introducing gas under pressure;

FIGURE 3 is a sectional view of the filter box or compartment showing the internal elements;

FIGURE 4 is a sectional view illustrating the manner in which the improved filter structure may be employed in a two-compartment sewage treatment tank;

FIGURE 5 is a diagrammatic showing in three steps, the action of the filter, the forward and reverse flow therethrough, also the simultaneous bacteria or digestive action within and around the filter;

FIGURE 6 shows in section a two-compartment septic tank with the improved filter-bacteria promoting structure located in the second compartment;

FIGURE 7 is a view in section showing two improved filter structures connected in series in separate compartments, together with a means in common for supplying gas under pressure to each of the two filters; while FIGURE 8 is a fragmentary enlarged view of a flap valve accessory that may be employed to advantage in connection with the filter structure.

Referring to FIGURE 1, reference character 1 represents an ordinary septic tank or reservoir of any shape (rectangular as illustrated) and usually made of concrete. It is closed on all sides and the bottom with poured concrete, but the top is temporarily closed by slabs 2 of concrete laid adjacent one another with ship-lath joints which tend to tighten up when pressure is exerted on the top.

The sides of the tank have inlet and outlet openings to which pipes 3, 4 may be connected. The pipe 3 usually comes from the sewer system of a house. The pipe 4 passes into a second tank 5 which may be similar to the first tank as to its outer construction. The second tank has an outlet pipe for the effluent indicated at 6. Passing through the top of the tank 5 there is a metal pipe 7, the purpose of which will be explained hereinafter.

It will be understood that the tanks 1 and 5 are usually buried underground and the pipe 7 is of sufficient length to extend for a short distance above ground. Pipe 3 (the inlet of tank 1) is usually connected to the sewer system of a residence, office building or factory, while pipe 6 may be connected to a conventional leaching bed, dry well or storm sewer (not shown).

As illustrated in FIGURES 2 and 3, there is contained in the tank or reservoir 5 a centrally and vertically disposed concrete tank or compartment 8, preferably of cylindrical shape, closed at the top 9 except for the entering pipe 7. The bottom of the tank is open except for a heavy metal screen 10, and there are large openings 11 around the periphery of the cylindrical wall to give ready ingress and egress to the sewage. The screen 10 supports a sand and gravel filter of an improved character.

In the space immediately above the screen there are some fairly large stones, indicated at 13, and at the position farthest from the screen, i.e. near the top of the tank 8, there is a fairly thick layer of sand 14. Between the top sand layer and the bottom mass of stones there is a large quantity of gravel indicated at 15, with the larger objects of the gravel being immediately above the bottom stone layer and grading into smaller and smaller objects as the top sand layer is aproached. Consequently, the filter comprises sand at the top, large stones at the bottom with varying sizes of stones and gravel at the intermediate positions.

The pipe 6 extending inwardly toward the wall of the outer tank passes through the latter, as indicated at 6a, and communicates with the interior of the smaller tank 8 at the position 12. There is a flap valve (FIGURE 8) positioned at 12. This valve is hinged as at 17 in any suitable manner to the interior surface of the tank 8, and there is a tension spring 18 secured at one end to the valve and at the other end is anchored as at 19 to the interior surface of the small tank. The strength of this spring is such that it normally holds the flap valve open. But when gas under pressure is admitted to the tank, as explained hereinafter, this pressure is sufficient to cause the flap valve to close the opening in the pipe extension 6a. As shown, there is a fairly tight fitting plunger 19a extending into the lower end of the pipe 7 and a connecting piece 19b between the plunger and the flap valve.

In operation, the sewage from a residence first flows into tank 1, through the pipe 3, and may stay in that tank for a number of hours, possibly days, undergoing a septic or digestive operation due to the presence of anaerobic bacteria. This action causes the sewage to automatically separate into a heavy mass termed "sludge" which collects at the bottom of the tank and the lighter or scum-like portion which floats or otherwise stays at the top of the tank.

The sewage tends to settle in forms of strata of different density with the lightest layer at the top. As the septic tank completely fills with the sewage, this clearer fluid is evacuated from the middle of the tank through the pipe 4 and under normal conditions, the pipe would convey the fluid to a leaching bed.

However, having noted that under most conditions the exit fluid or effluent contains considerable solid material which has not responded to the digestive or septic action in the tank, it is the object of this invention to take this fluid and to pass it through an improved form of filtering system in order to remove even the last trace of solid material as well as additional dissolved materials from the liquid before the latter is passed on to the outlet pipe.

Accordingly, the effluent from the first sewage tank or reservoir is led through the pipe 4 (FIGURE 2) into the second tank 5, and then passes through the large openings 11 at the bottom of the inner compartment 8, up through the screen 10, then slowly finds its way upwardly through the filtering material 13, 14, 15. It then passes through the normally open valve 16 out through the pipe 6 to a leaching bed, leaching wall, sewer or stream.

However, the effluent in its final stage has been purified to such a considerable extent in passing through the improved filter that it can be released over the surface of the ground or any other open air position of disposal.

It will be understood that while the filter separates the solid or flocculent material from the liquid in a highly efficient manner, a purely mechanical separation, bacteria is also at work within the filter and in the area surrounding the filter within the outer tank 5. Thus, the purity of the effluent passing through the tube 6 depends upon the two types of "solid from liquid" separation and one of the aspects of this invention is to improve both forms of separation to the end that an increased purity of effluent is effected.

The purpose of the large stones 13 at the bottom of the filter 8 and the stones of graduating size terminating in a layer of sand at the top, is to provide a large area in the aggregate to which the flocculent material in the filter can adhere and thus remove the solid particles from the liquid which can then pass unimpeded through the filter and out at the pipe 6. In general, the greater the height of the large stone-small stone-gravel-sand mass, the greater will be the filtering or separating action.

Moreover, the flocculent material which adheres to the surfaces of the large and small elements of the filter mass absorbs aerobic bacteria which absorbs nutrients from the passing sewage. These bacteria, together with those that are present in the larger tank 5 which similarly absorbs nutrients from the contained sewage, all tend to separate the liquid from the solid portions, or at least to render the latter less odorous and less apt to pollute the leaching bed in the event that any portion thereof escapes out of the tank.

It will be noted that by placing the filter compartment 8 in the center of the tank and the outgoing line 6 at the top of the compartment, the sewage reaches the filter only during the least stage of its travel so that prior to passing up through the openings 11, the sewage is permitted to stay for a considerable length of time in the tank 5 where it has been subjected to the ordinary digestive and septic action. These aerobic bacteria are at work in the sewage contained in the tank 5 as well as the sewage passing through the filter.

It is known that the aerobic bacteria, in order to perform their function of absorption of the nutrients of the sewage, requires oxygen for, otherwise, the bacteria would die and the sewage separation become less effective since it would have to depend almost entirely on separation by specific weight or gravity.

In accordance with another feature of my invention, air under pressure is introduced through the pipe 7 which, as explained hereinbefore, closes the valve 16 by forcing the plunger 19a downwardly and passes through the filter out through the openings 11 and into the large area outside of the inner compartment 8. This air carries oxygen which is absorbed by the aerobic bacteria contained in the sewage that is in the filter and also contained in the main body of sewage surrounding the filter.

The effect of this oxygen is to accelerate the absorption of dissolved and suspended nutrients by the bacteria, in other words make them more active, and this action in turn increases the rate of separation between the liquid and the semi-solid particles or purification of the liquid. The liquid will rise to the top of the filter above the uppermost sand layer, and then pass out through the tube 6 through the normally open valve 16

It has been found that this increase in septic or digestive action brought about by the activation of the aerobic bacteria through the admission of an oxygen-containing gas is very appreciable. The air may be introduced from a drum (not shown) of compressed air positioned above ground directly above the pipe 7 through a suitable valve (not shown). The ordinary user of the septic tank could perform this duty.

In accordance with still another aspect of my invention, I have found that when compressed air is caused to enter the small tank 8, it will drive the semi-liquid contents contained within and above the filter downwardly so that a large part of the semi-liquid material will be forced out of the tank 8 through the openings 11 to join the sewage that is contained in the larger reservoir tank, thus temporarily raising the level of the sewage in the latter tank and lowering the level in the smaller tank 8, as shown in FIGURE 2.

When the force of air pressure is removed or cut off, the liquid material in the large tank and in the filter tend to seek equal levels through hydrostatic pressure so that there is an immediate rush of the sewage to enter the filter in order to raise the level therein. Consequently, the air under pressure first serves to cause the liquid in the filter to move in a direction (downward) opposite to its normal direction of movement (upward) and this gives a cleansing action similar to the back-wash of a water softener.

This back-wash or reverse movement of the sewage in the filter is of course in addition to the highly beneficial effects of the air or other ogygen-containing gas from the standpoint of enlivening the aerobic bacteria and encouraging the bacteria to propagate and live. The furnishing of this air gives a considerable period of time in which the bacteria and effluent adhering to the filter media may absorb the air.

This also would force the decayed bacteria out of the filter, providing more living room for the bacteria as well as supplying the longer tank with enriched aerobic bacteria.

The larger the area or the volume of the filter media, generally will promote a better effluent because of the increased living area of the aerobic bacteria and of the greater distance that the liquid has to flow through the filter media.

In the absence of air under pressure, it is obvious that the sand filter would be susceptible to clogging by the flocculent materials. The sand filters that are employed in municipal systems which do not include the use of the large stones 13 nor the use of a compressed air back washing facility are often plagued with complete stoppage on account of the flocculent material wedging itself between the particles of sand, in which case it becomes necessary periodically to clean off the top layer of sand and then replace with new sand or filter media. Also, quite often there is a scarcity of aerobic bacteria and then anaerobic bacteria develops, giving off noxious gases.

This operation would be impossible to perform in the case of a privately owned septic tank where the latter is positioned under several feet of ground and which would require digging the ground up from the top and then removing the top of the tank. But in applicant's case there is only the requirement to connect a source of compressed air to the upstanding pipe 7 and this air will provide not only the necessary back-wash or "unclogging" effect, but will also serve to increase the digestive action of the tank by encouraging the propagation of the aerobic bacteria which absorb nutrients from the sewage. Preferably, the blowing-in of the air should be accomplished by an automatic cycle of not more than one hour and the duration of this application of air will depend on the filter size and the pump capacity. This short cycling is important because the injected oxygen will substantially prevent the aerobic bacteria from dying from lack of oxygen.

In FIGURE 5 there is a diagrammatic showing of the series of steps by which in step A the sewage is shown as passing out of the larger tank 5 into the smaller tank 8 and up through the filter and out through the tube 6. The step B indicates the movement of the air downwardly through the filter out through the lower openings 11 and into the area of the larger tank where it carries oxygen to the aerobic bacteria found either within the filter or in the area surrounding the filter. Step C indicates the change in direction of the back-to-normal direction of the movement of the sewage going up through the filter when the air through the pipe 7 is interrupted.

FIGURE 4 shows a modified form of a septic tank in which there are two compartments 20, 21 separated by a partition 22. The inlet pipe is indicated at 4 and the outlet pipe is shown at 23. The filter tank 8 is contained in the first compartment 20 and is similar to that shown and described in connection with the earlier figures. However, the output of the tank is taken through a pipe 24 through the partition 22 near the bottom of the large tank 5 so that an additional septic or digestive action is permitted to take place in the second of the two compartments 21.

Thus, the partition 22 serves to separate the two septic actions that take place in the tank as a whole, the first separation to the left of the partition 22 being constituted of the digestive action in the compartment 20 as well as the filtering action in the tank 8, while there is only a single digestive action in the second compartment 21, because at this point practically all of the solid matter has already been eliminated by the time that the effluent reaches the pipe 24. There is indicated at 24a a difference between the level of the sludge that may collect in the respective compartments 20, 21, showing the progressive manner in which the separating facilities are each performing their cleansing functions.

In FIGURE 4, the valve 16 may be pressure-responsive as in the case of FIGURE 2, so that when air is admitted to the pipe 7, none of the air will reach the compartment 21 but will travel only through compartment 20. However, if desired, any special and well known form of valve could be used in place of the flap valve to allow air at reduced pressure and/or in small quantities to reach the compartment 21, and thus enliven any aerobic bacteria in this compartment that is assisting in further purifying the effluent.

FIGURE 6 shows a structure in which an ordinary septic tank, for example similar to the structure 1 in FIGURE 1, can be combined with the improved filter-containing tank, similar to that shown at 5 in FIGURE 1, and housed in a single tank. In this case, the outer tank made of concrete is indicated at 25 and has the usual inlet conduit 26 and the outlet conduit 27 which may pass to a leaching bed.

There is a partition 28 extending from the top to the bottom of the tank but communication between the compartment 29, 30 is effected through a pipe 31 near the bottom of the partition. This pipe is connected to a round concrete bowl 32 supported on blocks 33 and having a screen 34 at the top which may be shaped like an overhanging roof. The filter tank 8 may be similar to that described in connection with FIGURE 2 and to which air is periodically applied through the pipe 7 for cleaning the filter and enlivening the aerobic bacteria.

Thus, the sewage as it arrives in the compartment 29 will tend to stratify in the form of supernatant fluid at the top, sludge at the bottom due to the septic or digestive action. The fluid will then pass through the screen 34, through the bowl 32, the pipe 31, thence through the bottom of the filter 8, through the stone-gravel-sand filter, and out through the pipe 27.

When compressed air is attached to the tube 7, it forces the liquid in the filter downwardly, partially empties the filter and causes the level of the sewage in the compartment 30 to rise. In this case the effect of the pressure would cause the level of the sewage in the first compartment or reservoir 29 to rise but there would be very little, if any stirring up of the collected sludge at the bottom of the tank. However, some of the aerobic bacteria and liquid containing dissolved oxygen that was introduced into the filter and compartment 30 will reach the compartment 29 and accelerate the digestive action in that compartment due to the presence of aerobic bacteria. It should be noted that during the "back-wash" operation described hereinbefore, the screen or other form of filter 34 is simultaneously back-washed to relieve it of any adhering solids.

FIGURE 7 shows the use of my improved filter as a series of tandem connected units in order to intensify the effectiveness of the enlivement of the aerobic bacteria. The tank is indicated at 35 and has the inlet and outlet pipes 36, 37 respectively. There is a partition 38 extending from top to bottom to the large tank to form the compartments 39, 40. In the compartment 39 there is a large filter structure 8, similar to that described in connection with FIGURE 2, while in compartment 40 there may be a somewhat smaller filter 41 which is a duplicate in arrangement of the filter structure 8.

The effluent pipe 37 from the filter structure 8 passes through the partition 38 in order to deliver the treated sewage to the compartment 40 where it can pass upwardly through the small filter 41. The effluent pipe for the small filter 41 is indicated at 42 and may pass out to a leaching bed. The compressed air for each of the filter structures 8, 41 may be introduced through the pipe 7 which communicates with a branched pipe 43 passing into the top of each of the filter members 8, 41. If desired, a length of pipe 44 may be taken from the branch pipe 43 to have an outlet 45 in the compartment 39.

In this figure, the sewage enters the reservoir compartment 39 through the pipe 36, passes through the openings 11 into the filter structure 8, and is discharged through the normally open valve 16 into the pipe 37 to the second compartment 40. The treated sewage then can pass up through the second or smaller filter structure 41 and, upon being treated, passes through the normally open valve 16 to the effluent pipe 42.

In case either one or both of the fluid tanks 8, 41 appear to be partially or fully clogged, it is merely necessary to introduce compressed air through the pipe 7 which will force the liquid in the respective filters out through the bottom to give the back-wash effect, and also to enliven the aerobic bacteria in each of the compartments 39, 40. Consequently, the filtering masses are relieved of any adhering flocculent material, and thus cleansed, ready to perform the filtering function in an efficient manner when the air pressure is released at the pipe 7.

It will be noted that the pipe 44 serves to introduce full pressure air into the larger chamber 39 and that none of this air can ever reach the outgoing effluent line 42 on account of the closed system involved. Very little, if any, air will reach through the inlet line 36 and pass through into the sewer of the house. Thus, as in the case of the other structures shown and described herein, and with particular reference to the diagram (FIGURE 5), the combination of the compressed air distributing system together with the filter structures, all serve accumulatively to separate the solid particles from the liquid, both by way of a mechanical separation in the filter and the separation brought about by bacteria or septic effect.

It should be noted that in all of the embodiments of the invention, the sewage is introduced into the filter at the bottom and works its way upwardly to the outward pipe. This is advantageous to prevent the unnecessary packing of the solid particles caused by gravity in passing through the filter and it further allows the decayed bacteria to drop back into the treatment chamber.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described by invention, what I claim as new and desire to secure by Letters Patent is:

1. In the art of treating sewage contained in a plurality of compartments in connection with one another, the step of causing the sewage to pass through a mechanical filter in one of said compartments, the further step of intermittently introducing an oxygen-containing gas in and around the filter to activate the bacteria contained in the sewage in the said compartment, the additional step of employing the pressure of the gas to drive the liquid content of the sewage out of the filter and into another of said compartments to a level higher than the level of the remaining sewage in the said one compartment and the final step of discontinuing the gas pressure in order to permit the liquid to return from said other of the compartments and to flow through the filter in a direction reverse of the direction in which said gas had driven the sewage until it attains its normal level whereby the filter is automatically cleansed of foreign particles during the expulsion and return of the liquid in the said one compartment.

2. A tank adapted to contain sewage and having inlet and outlet openings, a partition across said tank to form two compartments in communication with one another, means for permitting a septic action to take place within the first of said compartments nearer to the inlet opening, means for passing the treated sewage from the first to the second compartment nearer to the outlet opening, filtering means in the second compartment through which the sewage must pass on its way to said outlet opening, said filtering means comprising a tank containing layers of sand, gravel, and stone, with the sand layer nearer said outlet opening, and means accessible to the exterior of the tank and including gas under pressure for periodically cleansing the sand, gravel, and stone layers of the filter, said gas being applied against the sand layer in a direction opposite to the direction of normal sewage flow through the filtering means, the force of said gas being sufficient to cause the sewage in the filter to leave the second compartment and flow into the first compartment whereby the levels of the sewage in the two compartments are different and upon withdrawal of the gas the sewage is caused to seek equal levels through hydrostatic pressure which in turn causes a flow back into the second compartment and its filter.

3. In the art of treating sewage contained in a plurality of compartments, in communication with one another, the step of causing the sewage to pass through a mechanical filter in one of said compartments, the further step of intermittently introducing an oxygen-containing gas in and around the filter to activate the bacteria contained in the sewage in said compartment, the additional step of employing the pressure of the gas to drive the liquid content of the sewage out of the filter and into another of said compartments to a level higher than the level of the remaining sewage in the said one compartment and the final step of discontinuing the gas pressure to cause the liquid to flow in a reverse direction, so as to enter the compartment from which it was driven, due to the hydrostatic pressure developed by the difference in levels of the liquid in the respective compartments, whereby the sewage eventually attains the same level in both compartments and the filter is cleansed of foreign materials during the expulsion from and return of the liquid into the said one compartment.

References Cited in the file of this patent

UNITED STATES PATENTS

| | | |
|---|---|---|
| 246,003 | Goldman | Aug. 23, 1881 |
| 644,531 | Morton | Feb. 27, 1900 |
| 1,088,929 | Reisert | Mar. 3, 1914 |
| 1,325,352 | Darrach | Dec. 16, 1919 |
| 2,760,643 | Schaaf | Aug. 28, 1956 |
| 3,029,950 | Frasca | Apr. 15, 1962 |

FOREIGN PATENTS

| | | |
|---|---|---|
| 2,012 | Great Britain | of 1913 |
| 2,589/26 | Australia | June 30, 1926 |